(12) United States Patent
Imafuku

(10) Patent No.: US 6,602,930 B2
(45) Date of Patent: Aug. 5, 2003

(54) MATERIALS FOR CONTACT LENSES COMPRISING A MACROMER HAVING THE POLYSILOXANE STRUCTURE IN THE SIDE CHAIN

(75) Inventor: Suguru Imafuku, Tokyo (JP)

(73) Assignee: Hoya Healthcare Corporation, Tokyo (JP)

( * ) Notice: Subject to any disclaimer, the term of this patent is extended or adjusted under 35 U.S.C. 154(b) by 13 days.

(21) Appl. No.: 09/790,891

(22) Filed: Feb. 23, 2001

(65) Prior Publication Data

US 2002/0005933 A1 Jan. 17, 2002

(30) Foreign Application Priority Data

Feb. 24, 2000 (JP) ........................................ 2000-047171
Jan. 10, 2001 (JP) ........................................ 2001-002135

(51) Int. Cl.[7] ........................... G02C 7/04; C08G 77/12; C08G 77/14
(52) U.S. Cl. ........................ 523/107; 523/106; 523/108; 528/28; 351/160 R
(58) Field of Search ................................. 523/106, 107, 523/108; 525/158, 218; 528/28; 351/160 R

(56) References Cited

U.S. PATENT DOCUMENTS

| 4,486,577 A | 12/1984 | Mueller et al. |
|---|---|---|
| 5,034,461 A | 7/1991 | Lai et al. |
| 5,070,169 A | 12/1991 | Robertson et al. |
| 5,070,215 A | 12/1991 | Bambury et al. |
| 5,260,000 A | 11/1993 | Nandu et al. |
| 5,352,714 A | 10/1994 | Lai et al. |
| 5,426,158 A | 6/1995 | Mueller et al. |
| 5,449,729 A | 9/1995 | Lai |
| 5,480,946 A | 1/1996 | Mueller et al. |
| 5,952,444 A | 9/1999 | Ayama |
| 5,962,548 A | 10/1999 | Vanderlaan et al. |
| 5,965,631 A | 10/1999 | Nicolson et al. |
| 5,981,675 A | 11/1999 | Valint, Jr. et al. |

FOREIGN PATENT DOCUMENTS

| JP | A-3-206418 | 9/1991 |
|---|---|---|
| JP | A-3-294818 | 12/1991 |
| JP | A-11-502894 | 3/1999 |
| JP | A-11-502949 | 3/1999 |
| WO | WO 96/31791 | 10/1996 |
| WO | WO 96/31792 | 10/1996 |
| WO | WO 97/22017 | 6/1997 |

OTHER PUBLICATIONS

*Chemical Abstracts*, vol. 133, No. 6, (Aug. 2000), Abstract No. 79401, Kirahara, Yoshitaka: "*Polyurethane lens materials and eye lenses with high transparency, oxygen permeability, and strength*", XP–002218087 and UP 2000 178336 A (Hoya Corp., Japan), (Jun. 2000).

S. Michima, "Contact Lens Wear and Corneal Physiology", Journal of Japan Contact Lens Society, vol. 36, No. 1, 1994.

*Primary Examiner*—Tae H. Yoon
(74) *Attorney, Agent, or Firm*—Jacobson Holman PLLC

(57) ABSTRACT

A material for contact lenses having excellent flexibility and oxygen permeability are disclosed. The material comprises a copolymer essentially comprising a siloxane macromer of component (A) which has the number-average molecular weight of from about 1,000 to 10,000 and is represented by the general formula (I), a water-insoluble monoolefin monomer of component (B), and a water-soluble monoolefin monomer of component (C). A soft contact lens which is obtained by injecting to a mold in the shape of contact lens the components (A), (B) and (C); copolymerizing the monomer mixture; and making the resulting copolymer contain water,

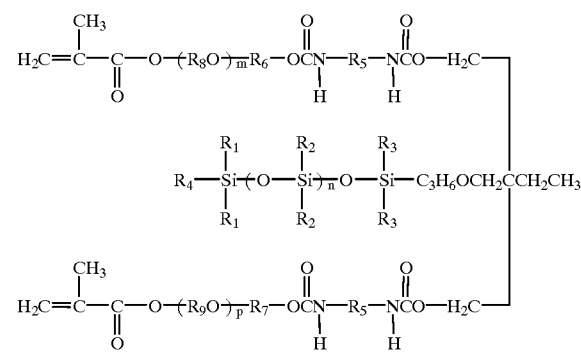

(I)

15 Claims, No Drawings

MATERIALS FOR CONTACT LENSES COMPRISING A MACROMER HAVING THE POLYSILOXANE STRUCTURE IN THE SIDE CHAIN

BACKGROUND OF THE INVENTION

1. Field of the Invention

The present invention relates to a material for contact lenses which is suitable as a polymer having biocompatibility and oxygen permeability, and to soft contact lenses. The soft contact lenses of the present invention have the water content of, for example, from 15 to 35%, and excellent flexibility and oxygen permeability.

2. Related Art

Clinical results have indicated that a use of contact lenses reduces the supply of oxygen from the air, which may sometimes cause inhibiting proliferation of corneal epithelial cells and corneal swelling. Accordingly, an improvement of the material in oxygen permeability has been attempted so far in order to provide contact lenses having higher safety.

In the improvement in oxygen permeability of hard contact lenses, introduction of siloxanyl methacrylate, fluoroalkyl methacrylate or the like has been attempted. This method remarkably improved oxygen permeability of hard contact lenses; however, the aggravation of the feel in use caused by the hard material has not be improved at all. On the other hand, soft contact lenses are categorized into no-water-containing soft contact lenses and water-containing (hydrogel) lenses. As for the no-water-containing soft contact lenses, silicone lenses, for example, have high oxygen permeability; however, too much elasticity causes lenses to stick to the cornea, and accordingly, they have not been practically utilized. Lenses made of (meth)acrylic esters have a rather low oxygen permeability constant, which is an insufficient value. The water-containing soft contact lenses are known to be comfortable in use due to flexibility of the material; however, their oxygen permeability is derived from the water content of the lenses, and thereby lower compared with that of hard contact lenses. For example, a material for water-containing soft lenses having the water content of 80% has the oxygen permeability constant of about $40 \times 10^{-11}$ $(cm^2/sec) \cdot (mL\ O_2/mL \times mmHg)$.

A number of reports have been made with respect to the oxygen amount necessary for the cornea. Mishima compared the oxygen permeability of contact lenses with the corneal change in use, and reported that Dk/L of a contact lens corresponding to the cornea swelling ratio of 0 (the value obtained by dividing the Dk value (oxygen permeability) by the thickness of the lens (cm)) was not less than $70 \times 10^{-9}$ (Nichi-Kore-Shi 36: 1–12, 1994). The oxygen permeability of common soft contact lenses depends on the water content; accordingly, it is extremely difficult to prepare lenses satisfying the Dk/L value (oxygen transmissibility) of $70 \times 10^{-9}$.

Accordingly, various siloxane-containing polymers have been disclosed in order to improve oxygen permeability of soft contact lenses. For example, Japanese Patent Laid-Open No. 294818/1991 (hereinafter referred to as prior art 1) discloses, as a soft contact lense having excellent oxygen permeability, low water-containing soft contact lenses which substantially comprise an organosiloxanyl (meth)acrylate, a fluorine-containing monomer and dimethylacrylamide as the main components. In this case, oxygen permeability may be improved by introducing silicone and the fluorine-containing monomer as the components of the contact lenses; however, the improvement is insufficient, and the resulting lenses are hard and poor in shape restorablility, which is caused by low molecule movability between a moiety having silicone group or fluorine group and a functional group (e.g., methacroyl group).

International Patent Publication (KOHYO) No.502949/1991 (hereinafter referred to as prior art 2) discloses soft contact lenses having excellent oxygen permeability which comprise a siloxane macromer as the main component. In this case, soft contact lenses having high oxygen permeability and excellent flexibility can be obtained by using a siloxane macromer having a high molecular weight as the main component. However, the macromer having the structure disclosed in the prior art 2 has the siloxane structure in the main chain and functional groups at the both ends, and thereby, the both ends of the macromer bind to other components in the polymer to inhibit the movability of the siloxane structure. Therefore, it cannot be actually expected to dramatically improve the oxygen permeability.

Accordingly, an object of the present invention is to provide a material for contact lenses and soft contact lenses having excellent flexibility and oxygen permeability.

The inventors of the present invention made intensive studies on the basis of the aforementioned prior arts in order to develop soft contact lenses having oxygen permeability in the same degree as or more than hard contact lenses. As a result, they successfully developed a material for soft contact lenses having satisfactory flexibility and oxygen permeability by using a siloxane macromer in which a polymerizing group binds to the polysiloxane side chain by means of urethane bond to maintain high movability of the siloxane structure which contributes to oxygen permeability in the polymer. The present invention was achieved on the basis of these findings.

SUMMARY OF THE INVENTION

The present invention relates to a material for contact lenses which comprises a copolymer essentially comprising a siloxane macromer of component (A) which has the number-average molecular weight of from about 1,000 to 10,000 and is represented by the general formula (I):

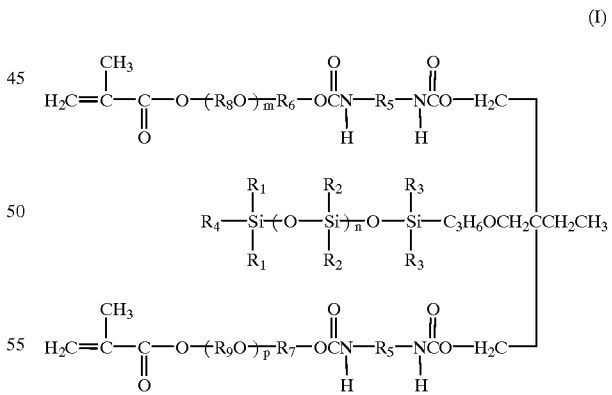

wherein $R_1$, $R_2$ and $R_3$ are independently selected from C1–C4 alkyl groups; $R_4$ is selected from C1–C6 alkyl groups; $R_5$ is a residue obtained by removing NCO group from an aliphatic, alicyclic or aromatic diisocyanate; $R_6$, $R_7$, $R_8$ and $R_9$ are independently selected from C1–C3 alkylene groups; n is an integer of from 4 to 80; and m and p are independently an integer of from 3 to 40,
a water-insoluble monoolefin monomer of component (B), and a water-soluble monoolefin monomer of component (C).

The present invention further relates to a soft contact lens which is obtained by molding the aforementioned material for contact lenses in the shape of contact lens, and making the lens contain water.

In addition, the present invention relates to a soft contact lens which is obtained by injecting to a mold in the shape of contact lens a monomer mixture comprising a siloxane macromer of component (A) which has the number-average molecular weight of from about 1,000 to 10,000 and is represented by the general formula (I):

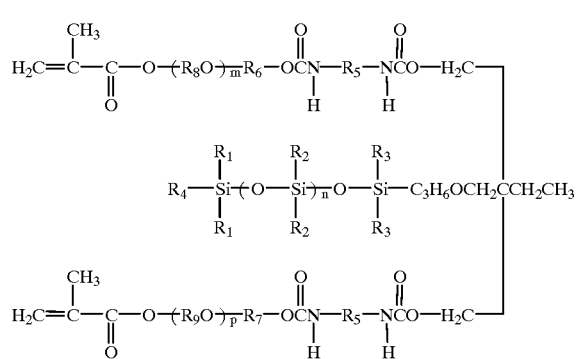

wherein $R_1$, $R_2$ and $R_3$ are independently selected from C1–C4 alkyl groups; $R_4$ is selected from C1–C6 alkyl groups; $R_5$ is a residue obtained by removing NCO group from an aliphatic, alicyclic or aromatic diisocyanate; $R_6$, $R_7$, $R_8$ and $R_9$ are independently selected from C1–C3 alkylene groups; n is an integer of from 4 to 80; and m and p are independently an integer of from 3 to 40,
a water-insoluble monoolefin monomer of component (B), and a water-soluble monoolefin monomer of component (C); copolymerizing the monomer mixture; and making the resulting copolymer contain water.

DESCRIPTION OF PREFERRED EMBODIMENTS

The material for contact lenses of the present invention comprises a copolymer essentially comprising a siloxane macromer of component (A), a water-insoluble monoolefin monomer of component (B), and a water-soluble monoolefin monomer of component (C).

The siloxane macromer of component (A) is a component which may provide excellent flexibility and oxygen permeability, and the water-insoluble monoolefin monomer of component (B) and the water-soluble monoolefin monomer of component (C) are those which may provide properties corresponding to the purposes such as flexibility, oxygen permeability, and the desired water content. The material for contact lenses of the present invention comprises the copolymer components comprising these 3 components, thereby is a material for contact lenses having excellent flexibility and oxygen permeability, which have not been obtained in the conventional materials.

The siloxane macromer of component (A) is represented by the aforementioned general formula (I) and has the number-average molecular weight of from about 1,000 to 10,000. When the number-average molecular weight of the siloxane macromer of component (A) is less than about 1,000, the lens cannot have sufficient oxygen permeability, and when it is more than about 10,000, the molecular weight is so high that the compatibility with other copolymer components may be degraded, and the component (A) may sometimes dissolve insufficiently in formulation. The number-average molecular weight of the siloxane macromer of component (A) is preferably from 2,000 to 8,000.

In the aforementioned general formula (I) which represents the siloxane macromer of component (A), $R_1$, $R_2$ and $R_3$ may be the same or different. The C1–C4 alkyl groups include, for example, methyl group, ethyl group, propyl group, n-butyl group, tert-butyl group and the like, and preferred is methyl group. The C1–C6 alkyl groups represented by $R_4$ include, for example, methyl group, ethyl group, propyl group, n-butyl group, n-pentyl group, n-hexyl group and the like, and preferred is n-butyl group. In the residue obtained by removing NCO group from an aliphatic, alicyclic or aromatic diisocyanate represented by $R_5$, the aliphatic diisocyanate includes, for example, 1,4-diisocyanatobutane, 1,6-diisocyanatohexane and the like. The alicyclic diisocyanate includes, for example, 1,2-diisocyanatocyclohexane, 1,3-diisocyanatocyclohexane, isophorone diisocyanate and the like. The aromatic diisocyanate includes, for example, 2,4-toluenediisocyanate, 2,6-toluenediisocyanate, diphenylmethane-4,4'-diisocyanate and the like. The residue obtained by removing NCO group from an aliphatic, alicyclic or aromatic diisocyanate represented by $R_5$ preferably has the isophorone structure. $R_6$, $R_7$, $R_8$ and $R_9$ may be the same or different. The C1–C3 alkylene groups include, for example, methylene group, ethylene group, propylene group and the like, and preferred is C2 alkylene (ethylene) group.

The symbol "n" is an integer of from 4 to 80. It is not preferred that "n" is less than 4 because the lens cannot have sufficient oxygen permeability, and that "n" is more than 80 because the compatibility with other copolymer components may be degraded and the component (A) may sometimes dissolve insufficiently in formulation. The symbol "n" is preferably an integer of from 4 to 60, and more preferably an integer of from 4 to 40. The symbols "m" and "p" may be the same or different, and are integers of from 3 to 40. It is not preferred that "m" and "p" are less than 3 because the lens cannot have sufficient flexibility, and that they are more than 40 because the lens tends to have reduced strength or to be fragile. The symbols "m" and "p" are preferably integers of from 3 to 30, and more preferably integers of from 3 to 20.

The material for contact lenses of the present invention is preferably those wherein $R_1$, $R_2$ and $R_3$ are methyl groups, $R_4$ is n-butyl group, "n" is an integer of from 4 to 60, and "m" and "p" are independently an integer of from 3 to 30 in the general formula (I) because they have good physical properties such as flexibility and oxygen permeability.

The siloxane macromer of component (A) is preferably a component represented by the general formula (II):

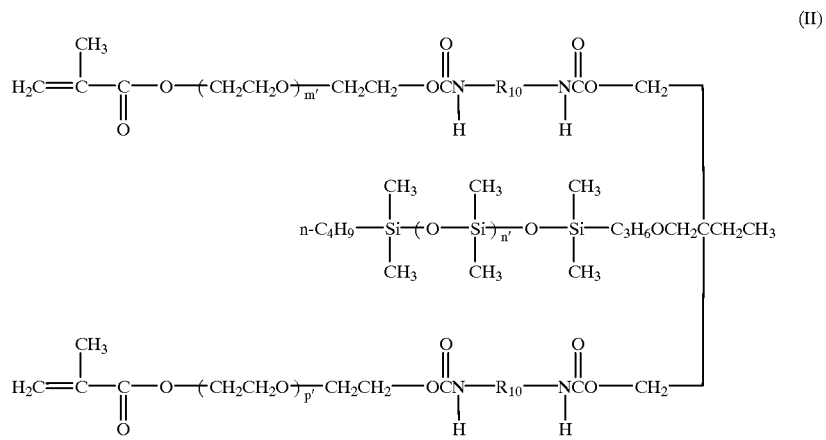

(II)

In the formula, $R_{10}$ is a residue obtained by removing NCO group from an aliphatic, alicyclic or aromatic diisocyanate. The aliphatic diisocyanate includes, for example, 1,4-diisocyanatobutane, 1,6-diisocyanatohexane and the like. The alicyclic diisocyanate includes, for example, 1,2-diisocyanatocyclohexane, 1,3-diisocyanatocyclohexane, isophorone diisocyanate and the like. The aromatic diisocyanate includes, for example, 2,4-toluenediisocyanate, 2,6-toluenediisocyanate, diphenylmethane-4,4'-diisocyanate and the like. The residue obtained by removing NCO group from an aliphatic, alicyclic or aromatic diisocyanate represented by $R_{10}$ preferably has the isophorone structure.

The symbol "n'" is an integer of from 4 to 40. When "n'" is in this range, the lens may advantageously have much better physical properties such as the strength, flexibility, and oxygen permeability. The symbol "n'" is preferably an integer of from 4 to 30. The symbols "m'" and "p'" are the same or different, and are integers of from 3 to 20. The symbols "m'" and "p'" to be in the range of from 3 to 20 provide advantages of much better physical properties such as the strength, flexibility and oxygen permeability of the lens. The symbols "m'" and "p'" are preferably integers of from 3 to 15.

The water-insoluble monoolefin monomer of component (B) is used for the purpose of providing oxygen permeability to the material for contact lenses as an assistance, and improving the mechanical strength. The water-insoluble monoolefin monomer of component (B) includes, for example, components derived from one or more monomers selected from the group consisting of tris (trimethylsiloxy)-γ-methacryloxypropylsilane, 2,2,2-trifluoroethyl methacrylate, hexafluoroisopropyl methacrylate, and perfluorooctylethyloxypropylene methacrylate.

The water-soluble monoolefin monomer of component (C) is used for the purpose of adjusting the water content of the soft contact lenses prepared from the material for contact lenses, and providing flexibility as an assistance. The water-soluble monoolefin monomer of component (C) includes, for example, components derived from at least one or more monomers selected from the group consisting of 2-hydroxyethyl methacrylate, N,N-dimethylacrylamide, N-vinyl-2-pyrrolidone, and methacrylic acid.

In the material for contact lenses of the present invention, the content of the siloxane macromer of component (A) is preferably from 10 to 60% by weight. The content of the siloxane macromer of component (A) of 10% by weight or more can provide sufficient flexibility and oxygen permeability to the lenses prepared from the material, and that of 60% by weight or less can prevent the bridge density from excessively increasing and the lenses from being brittle. More preferably, the content of the siloxane macromer of component (A) is from 15 to 50% by weight.

In the material for contact lenses of the present invention, the content of the water-insoluble monoolefin monomer of component (B) is preferably from 10 to 50% by weight. The content of the water-insoluble monoolefin monomer of component (B) of 10% by weight or more can provide a sufficient effect of addition of the water-insoluble monoolefin monomer of component (B), and that of 50% by weight or less can provide adequate flexibility and shape recovery to the lenses. More preferably, the content of the water-insoluble monoolefin monomer of component (B) is from 15 to 45% by weight.

In the material for contact lenses of the present invention, the content of the water-soluble monoolefin monomer of component (C) is preferably from 10 to 45% by weight. The content of the water-soluble monoolefin monomer of component (C) of 10% by weight or more can provide an appropriate water content to the lenses prepared from the material, and that of 45% by weight or less can prevent the water content in the lenses prepared from the material from excessively increasing, and oxygen permeability, which depends upon the water content, from markedly decreasing. More preferably, the content of the water-soluble monoolefin monomer of component (C) is from 15 to 40% by weight.

The material for contact lenses of the present invention may be a copolymer which comprises, in addition to the aforementioned 3 components, a component derived from a bridging monomer, for example, ethylene glycol di(meth)acrylate, diethylene glycol di(meth)acrylate, triethylene glycol di(meth)acrylate, allyl methacrylate, diallyl phthalate, diallyl maleate, diallyl isophthalate, triallyl isocyanurate and the like, in order to obtain the mechanical strength and endurance. In the present specification, "(meth)acrylate" means both of acrylate and methacrylate. The content of the aforementioned bridging monomer is preferably from 0.01 to 1% by weight to the total amount of the copolymerizing components. The amount of the bridging monomer of 0.01% by weight or more can provide the effect of addition of the mechanical strength and endurance, and that of 1% by weight or less can prevent the resulting soft contact lenses from being brittle.

The material for contact lenses of the present invention may further contain, for example, a polymerizing ultraviolet absorber, a polymerizing coloring matter and the like as copolymerizing components in order to add ultraviolet absorbability or a color to the resulting soft contact lenses. Specific examples of the aforementioned polymerizing ultraviolet absorber include 5-chloro-2-[2-hydroxy-5-(β-methacryloyloxyethylcarbamoylox yethyl)]phenyl-2H-benzotriazole, 2-[2-hydroxy-5-(β-methacryloyloxyethylcarbamoyloxyethyl)]p henyl-2H-benzotriazole, 5-chloro-2-[2-hydroxy-4-(p-vinylbenzyloxy-2-hydroxypropylo xy)]phenyl-2H-benzotriazole and the like.

Specific examples of the aforementioned polymerizing coloring matter include 1,4-bis(4-vinylbenzylamino) anthraquinone, 1-p-hydroxybenzylamino-4-p-vinylbenzylaminoanthraquinone, 1-anilino-4-methacryloylaminoanthraquinone and the like.

When coloring the contact lenses made of the material of the present invention, the vat dyeing method may be used which comprises soaking the lenses in a vat without using these coloring matters to sufficiently impregnate the whole lenses with a leucocompound of a dye, and then soaking the lenses in an oxidizing bath to convert the leucocompound into an oxidative compound and fix the dye. As other coloring agents, the material for contact lenses of the present invention may contain a phthalocyanine coloring matter such as Alcian Blue 8GX and Alcian Green 2GX. The suitable content of the aforementioned polymerizing ultraviolet absorber and polymerizing dye is 5% by weight or less of the copolymerizing components, and the particularly preferred is from 0.02 to 3% by weight, owing to the effect of the thickness of the lens prepared from the material. The amount of 5% by weight or less can prevent a decrease in the mechanical strength of the resulting contact lenses, and is preferable in safety as contact lenses which directly contact to the living body.

The present invention includes a soft contact lens which is obtained by molding the material for contact lenses according to the aforementioned present invention in the shape of contact lens, and making the lens contain water. The method of molding the material for contact lenses in the shape of contact lens and making the lens contain water may be performed in a conventional manner.

The present invention further includes a soft contact lens which is obtained by injecting to a mold in the shape of contact lens a monomer mixture comprising a siloxane macromer of component (A), a water-insoluble monoolefin monomer of component (B), and a water-soluble monoolefin monomer of component (C); copolymerizing the monomer mixture; and making the resulting copolymer contain water.

The siloxane macromer of component (A), the water-insoluble monoolefin monomer of component (B), and the water-soluble monoolefin monomer of component (C) are the same as those explained for the aforementioned material for contact lenses.

Among the soft contact lenses of the present invention, preferred are those wherein $R_1$, $R_2$ and $R_3$ are methyl groups, $R_4$ is n-butyl group, "n" is an integer of from 4 to 60, and "m" and "p" are independently an integer of from 3 to 30 in the aforementioned general formula (I) from the viewpoint of good physical properties such as the strength, flexibility, and oxygen permeability of the lenses.

In the soft contact lenses of the present invention, the siloxane macromer (A) is preferably a monomer represented by the general formula (II) which is explained for the aforementioned material for contact lenses from the viewpoint of much better physical properties such as the strength, flexibility and oxygen permeability of the lenses.

For the preparation of the material for contact lenses and the soft contact lenses of the present invention, a mixture containing the aforementioned monomer is at first added with a polymerization initiator and sufficiently stirred to give a homogeneous monomer mixture. The suitable content of the siloxane macromer (A) in the monomer mixture is from 10 to 60% by weight, that of the water-insoluble monoolefin monomer (B) is from 10 to 50% by weight, and that of the water-soluble monoolefin monomer (C) is from 10 to 45% by weight. As the polymerization initiator used herein, a peroxide such as lauroyl peroxide, qumene hydroperoxide, and benzoyl peroxide, 2,2'-azobis(2,4-dimethylvaleronitrile), and 2,2'-azobisisobutyronitrile may be used, and when applying the photopolymerization, a photoinitiator such as benzoin methyl ether, 1-hydroxycyclohexyl phenyl ketone, 2,2-dimethoxy-2-phenylacetophenone, and 2-hydroxy-2-dimethoxy-1-phenylpropane-1-one may be used.

In addition, the polymerization may be performed in the presence or absence of an appropriate diluent. The appropriate diluent may be any one so long as it homogeneously dissolves the monomer components used. The diluent includes, for example, an alcohol (e.g., ethanol, isopropanol, n-hexanol), a dipolar aprotic solvent such as dimethylsulfoxide, an ether (e.g., THF, dimethoxyethane), an ester (e.g., propyl acetate, isopropyl acetate, isobutyl acetate, tert-butyl acetate, butyl propionate, butyl butyrate), a mixed solvent of water and an alcohol (a water/ethanol mixed solvent) and the like. When using a diluent, the effects may be sometimes expected which are an easy injection into a mold caused by a decrease in the viscosity of the monomer mixture, and an improvement of the mechanical strength of the resulting lens by effective removal of the polymerization heat in polymerization.

The aforementioned monomer mixture is injected to a mold for preparation of contact lenses with or without the shape of contact lens, and then polymerized. The mold is in the combined shape having a convex curvature and a concave curvature, and may be made of a material such as metal, glass, resin and the like. The material preferably has excellent removability of the polymer and excellent resistance to solvent and heat. Among such materials, a mold made of resin is preferred because it can easily be prepared in the shape necessary to the desired lens design. The resin material is preferably selected from those having low contraction in formation, good surface transcription from the die, and excellent dimensional accuracy and resistance to solvent. Such resin materials include, for example, polyethylene, polypropylene, polymethylpentene (TPX), polysulfone, polyphenylene sulfide, cyclic olefin copolymers (e.g., "Apel", Mitsui Petrochemical Co. Ltd.; "ZEONEX", Nippon Zeon Co. Ltd.) and the like. When injecting the monomer, the mold is sufficiently exposed to reduced pressure to remove the substance affecting the reaction such as water and oxygen which exists on the surface of the mold, then the mold is purged with an inert gas such as nitrogen and argon, and then the monomer mixture is injected to the mold. Injection of the monomer mixture is preferably performed under an atmosphere of an inert gas such as nitrogen and argon.

The polymerization method includes, for example, a method of elevating the temperature stepwise or continuously in the range of from 25 to 120° C., and completing the polymerization for 1 to 24 hours. In this method, it is desirable that the polymerization is carried out under an atmosphere of an inert gas such as nitrogen and argon in the polymerization furnace at atmospheric pressure or under pressurized conditions. In the polymerization, a photopolymerization method by ultraviolet, visible radiation or the like may be applied after adding the aforementioned photopolymerization initiator.

After the polymerization, the lens is taken out of the mold, and then it may be applied to a known surface treatment if necessary. In the surface treatment with plasma, for example, the technique and apparatus known so far may be used, and an active gas such as air, oxygen, hydrogen and nitrogen, or an inert gas such as helium, neon and argon, and an organic low-molecular compound such as N-vinylpyrrolidone and acetylene may be used.

Molding Methods for the Shape of Contact Lens

When molding the copolymer as contact lenses, a molding method commonly used by persons with ordinary skill in the art may be applied. Such a molding method includes, for example, a cutting method, and a method of cutting or freeze-cutting the copolymer may be carried out after obtaining the copolymer in the shape of bars or blocks to mold the copolymer into the shape of contact lens.

Water-Imparting Treatment Methods

The mold in the shape of contact lens obtained by cutting or the Like, or the copolymer taken out of the mold in the shape of contact lens for preparation of contact lenses may be soaked in physiological saline or a preserving medium for soft contact lenses to be impregnated with water, and the desired contact lenses can be obtained.

In the soft contact lenses of the present invention, the water content and the oxygen permeability constant can be adjusted to the range of from 15 to 35% and not less than $7 \times 10^{-11}$ (cm$^2$/sec)·(mL O$_2$/mL×mmHg), respectively, by means of adjusting the aforementioned monomer components and the ratio thereof.

EXAMPLES

The present invention will be explained in further detail with reference to the examples. However, the present invention is not limited to these examples.

Example 1

(Synthesis of a Macromer (A))

To a three-neck flask, 8.88 g of isophorone diisocyanate, 0.025 g of dibutyltin dilaurate as the catalyst, and 45 mL of methylene chloride were added, and the mixture was stirred under a stream of nitrogen. Then, 20 g of α-butyl-ω-[3-(2, 2-(dihydroxymethyl)butoxy)propyl]polydimet hylsiloxane was accurately weighed and added dropwise to the flask over about 3 hours, and the reaction was carried out. After the reaction at room temperature for 48 hours, 0.025 g of another dibutyltindilaurate and 23.3 g of polyethylene glycol monomethacrylate were accurately weighed and added dropwise to the flask over about 30 minutes. The mixture was covered with aluminum foil and stirred until the absorption band derived from the isocyanate (2260 cm$^{-1}$) disappeared by IR (infrared absorption spectrum) analysis (a reaction at room temperature for about 48 hours). The resulting solution was further added with methylene chloride, then washed with a large quantity of water, dehydrated and filtered. Then the solvent was evaporated to obtain a macromer (A) having the structure represented by the following formula (III).

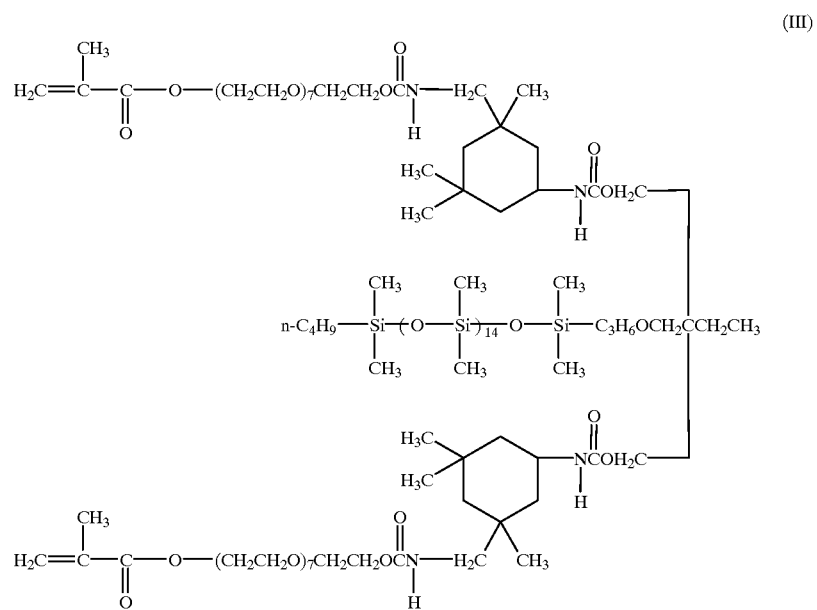

The resulting macromer had the following characteristics.

Results from IR Analysis

<1> Absorption bands derived from Si—CH$_3$ at 802 cm$^{-1}$ and 1259 cm$^{-1}$.

<2> An absorption band derived from Si—O—Si at from 1033 to 1099 cm$^{-1}$.

<3> An absorption band derived from C=O of methacryloyl group at 1720 cm$^{-1}$.

Results from 1H-NMR Analysis

<1> A peak derived from Si—CH$_3$ at around 0.1 ppm.

<2> A peak of methyl protons derived from isophorone diisocyanate and protons bound to the ring at around 0.8 to 1.2 ppm.

<3> A peak derived from methyl protons of methacryloyl group at around 1.95 ppm.

<4> A peak of vinyl protons of methacryloyl group at around 5.5 to 6.2 ppm.

(Preparation of Lenses)

To a glass sample bottle having the inner volume of 30 mL, 7 g of the macromer (A) represented by the aforementioned formula (III) (35% by weight), 7 g of tris(trimethylsiloxy)-γ-methacryloxypropylsilane (hereinafter referred to as RAVINOL) (35% by weight), 6 g of N-vinyl-2-pyrrolidone (hereinafter referred to as NVP) (30% by weight), 0.04 g of diallyl maleate (hereinafter referred to as DAM) (0.2% by weight to the total amount of the macromer (A), RAVINOL and NVP), and 0.1 g of 2,2'-azobisisobutyronitrile (hereinafter referred to as AIBN) (0.5% by weight to the total amount of the macromer (A), RVINOL and NVP) were added, and the mixture was sufficiently stirred to prepare a monomer mixture. The resulting monomer mixture was placed in a mold made of polypropylene in the shape of contact lens, and polymerization was carried out under a nitrogen atmosphere of 196,000 Pa (about 2 kgf/cm²) at 25 to 110° C. for 5 hours. After completion of the polymerization, the polymer was taken out of the mold, and then soaked in physiological saline to obtain the desired contact lens. The resulting contact lens had excellent flexibility and oxygen permeability.

The physical properties of this contact lens were determined. The results are shown in Table 1.

<1> Flexibility

The contact lens which attained the equilibratory swelling in physiological saline at 25° C. was folded double, then the shape was observed by using a contact lens shape measurement device, Contact Analyzer by Optimec Co. in physiological saline at 25° C. and evaluated on the basis of the evaluation criterion.

[Evaluation Criterion]

O: Immediate return to the original shape, and no change in the shape of the lens.
Δ: Return to the original shape after a while.
x: Not return to the original shape.

<2> Measurement of the Water Content

The water content was calculated from the following equation, provided that the weight of the contact lens which attains the equilibratory swelling in physiological saline at 25° C. after hydration swelling is defined as Ww, and the weight after re-drying (80° C., 4 hours) is defined as Dw.

Water content (%)=[(Ww−Dw)/Ww]×100

<3> Determination of the Oxygen Permeability Constant

Using lenses having various thickness, the oxygen permeability constant of the test peaces was determined in physiological saline at 35° C. with a Seika-Ken type film oxygen permeation meter by Rika-Seiki-Kogyo Co. Ltd. The unit of the oxygen permeability constant is $(cm^2/sec) \cdot (mL\ O_2/mL \times mmHg)$, and the oxygen permeability constant in the table is a value obtained by multiplying the original value of the oxygen permeability constant by $10^{11}$.

TABLE 1

| No. | Example 1 | 2 | 3 | 4 | 5 | 6 | 7 | 8 | 9 | 10 | Comparative example 1 | 2 | 3 |
|---|---|---|---|---|---|---|---|---|---|---|---|---|---|
| Macromer (III) | 35 | 20 | 50 | 30 | 40 | 50 | 50 | 25.5 | 24 | 24 | | | |
| RAVINOL | 35 | 50 | 20 | 30 | 30 | 20 | 20 | 34 | 32 | 32 | 53 | 35 | 50 |
| NVP | 30 | 30 | 30 | 40 | | | | | | | | 30 | |
| DMAA | | | | | 5 | 15 | 10 | 18.7 | 17.6 | 17.6 | 25 | | |
| RENA | | | | | 25 | 15 | 20 | 6.8 | 6.4 | 6.4 | | | |
| Macromer (IV) | | | | | | | | | | | | 35 | |
| 3FMA | | | | | | | | | | | 21 | | 50 |
| DAM | 0.2 | 0.2 | 0.2 | 0.2 | | | | | | | | 0.2 | |
| EDMA | | | | | | | | | | | 1 | | 2 |
| EtOH | | | | | | | | | 20 | | | | |
| HeOH | | | | | | | | 15 | | | | | |
| B-Acetate | | | | | | | | | | 20 | | | |
| AIBN | 0.5 | 0.5 | 0.5 | 0.5 | 0.5 | 0.5 | 0.5 | 0.5 | | | | 0.5 | 0.35 |
| V-65 | | | | | | | | | | | 0.5 | | |
| Darocur 1173 | | | | | | | | | 0.7 | 0.7 | | | |
| Flexibility | O | O | O | O | O | O | O | O | O | O | X | O | — |
| Water content | 29 | 26 | 31 | 34 | 18 | 26 | 23 | 23 | 24 | 24 | — | 27 | — |
| Oxygen permeability constant | 103 | 82 | 118 | 90 | 112 | 120 | 124 | 128 | 125 | 125 | — | 64 | 60 |

Examples 2 to 10

Contact lenses were obtained in a similar manner to that in Example 1 except that the composition was changed as shown in Table 1. In Examples 8 to 10, the diluent was used in combination shown below. The resulting contact lenses had excellent flexibility and oxygen permeability. DMAA and HEMA mean N,N-dimethylacrylamide and 2-hydroxyethyl methacrylate, respectively.

Example 8

To a glass sample bottle having the inner volume of 30 mL, 5.1 g of the macromer (A) represented by formula (III) (25.5% by weight) 6.8 g of RAVINOL (34% by weight), 3.74 g of DMAA (18.7% by weight), 1.36 g of HEMA (6.8% by weight), 3 g of 1-hexanol (hereinafter referred to as HeOH) as the diluent (15% by weight) and 0.085 g of AIBN (0.5% by weight to the total amount of the macromer (A), RAVINOL, DMAA and HEMA) were added, and the mixture was sufficiently stirred to prepare a monomer mixture. After that, contact lenses were obtained in a similar manner to that in Example 1. The resulting contact lenses had excellent flexibility and oxygen permeability as shown in Table 1.

Example 9

To a glass bottle having the inner volume of 30 mL, 4.8 g of the macromer (A) represented by formula (III) (24% by weight) 6.4 g of RAVINOL (32% by weight),3.52 g of DMAA (17.6% by weight), 1.28 g of HEMA (6.4% by weight), 4 g of ethanol (hereinafter referred to as EtOH) as the diluent (20% by weight), and 0.112 g of 2-hydroxy-2-dimethoxy-1-phenylpropane-1-one (hereinafter referred to as Darocur1173) (0.7% by weight to the total amount of the macromer (A), RAVINOL, DMAA and HEMA) were added, and the mixture was sufficiently stirred to prepare a monomer mixture. Then, the monomer mixture was placed in a mold made of polypropylene in the shape of contact lens, and polymerization was carried out by irradiating ultraviolet light (300 to 400 nm) of about 25 mW/cm² at room temperature for about 80 minutes. After that, the contact lenses obtained by a similar treatment to that in Example 1 had excellent flexibility and oxygen permeability as shown in Table 1.

Example 10

Contact lenses were obtained in a similar manner to that in Example 9 except that the composition was changed as shown in Table 1. The resulting contact lenses had excellent flexibility and oxygen permeability as shown in Table 1. B-Acetate means tert-butyl acetate.

Comparative Example 1
(Prior Art 1, Example 2)

A monomer mixture was prepared by mixing 10.6 g of RAVINOL (53% by weight), 4.2 g of 2,2,2-trifluoroethyl methacrylate (hereinafter referred to as 3FMA) (21% by weight), 5 g of N,N-dimethylacrylamide (hereinafter referred to as DMAA) (25% by weight), 0.2 g of ethylene glycol dimethacrylate (hereinafter referred to as EDMA) (1% by weight), and 0.1 g of 2,2'-azobis(2,4-dimethylvaleronitrile) (hereinafter referred to as V-65) (0.5% by weight to the total amount of the monomers) and contact lenses were obtained in a similar manner to that in Example 1. The resulting contact lenses had poor flexibility and did not return to the original shape after folding double.

Comparative Example 2
(Material Mainly Composed of a Macromer Having the Dimethylsiloxane Structure as the Main Chain)

Contact lenses were obtained in a similar manner to that in Example 1 except for using a macromer (B) having the dimethylsiloxane structure as the main chain represented by the following formula (IV) in the place of the macromer (A). The resulting contact lenses had less oxygen permeability constant than those of the contact lenses described in Examples 1 to 10.

Comparative Example 3
(Material for Hard Contact Lenses)

A monomer mixture was prepared by mixing and sufficiently stirring 20 g of RAVINOL (50% by weight), 20 g of 3FMA (50% by weight), 0.8 g of EDMA (2% by weight to the total amount of RAVINOL and 3FMA), and 0.14 g of AIBN (0.35% by weight to the total amount of RAVINOL and 3FMA). The resulting monomer mixture was placed in a pipe made of polyethylene, and polymerization was carried out at 45° C. for 120 hours. After the polymerization, the polymer in the shape of bar was taken out of the pipe and dried in a dryer at 110° C. overnight. The resulting polymer was cut by the fixed thickness, and used for the determination of the oxygen permeability constant. The oxygen permeability constant of the resulting polymer was less than those of the contact lenses described in Examples 1 to 10.

As shown in Table 1, the contact lenses in Comparative Example 1 had poor flexibility (e.g., when folding double, the shape did not return to the original) and was not able to be used as soft contact lenses. The contact lenses of Comparative Examples 2 and 3 had low oxygen permeability constants.

In comparison with this, any one of the contact lenses of Examples 1 to 10 had excellent flexibility and also a high oxygen permeability constant. This can be considered as the effect resulting from a use of the siloxane macromer of the present invention in which the polymerizing group is bound to the polydimethylsiloxane side chain by means of urethane bond.

The material for contact lenses of the present invention has excellent flexibility and high oxygen permeability. Accordingly, the material prepared by the present invention is suitable for contact lenses, especially for water-containing soft contact lenses.

The present disclosure relates to the subject matter contained in Japanese Patent Application No. 2000-47171 filed on Feb. 24, 2000 and Japanese Patent Application No. 2001-2135 filed on Jan. 10, 2001, which are expressly incorporated herein by reference in their entirety.

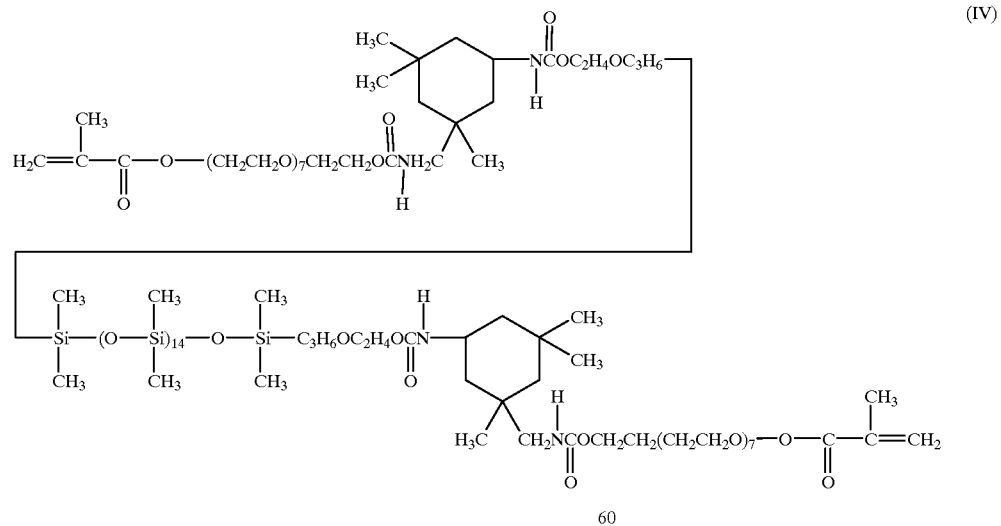

(IV)

What is claimed is:

1. A material for contact lenses which comprises a copolymer essentially comprising a siloxane macromer of component (A) which has the number-average molecular weight of from about 1,000 to 10,000 and is represented by the general formula (I):

(I)

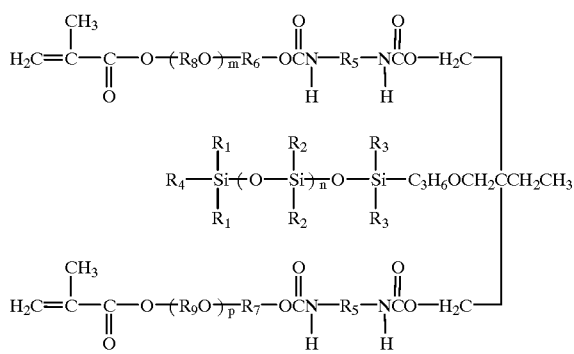

wherein $R_1$, $R_2$ and $R_3$ are independently selected from C1–C4 alkyl groups; $R_4$ is selected from C1–C6 alkyl groups; $R_5$ is a residue obtained by removing NCO group from an aliphatic, alicyclic or aromatic diisocyanate; $R_6$, $R_7$, $R_8$ and $R_9$ are independently selected from C1–C3 alkylene groups; n is an integer of from 4 to 80; and m and p are independently an integer of from 3 to 40,
a water-insoluble monoolefin monomer of component (B), and a water-soluble monoolefin monomer of component (C).

2. The material for contact lenses according to claim 1 wherein $R_1$, $R_2$ and $R_3$ are methyl groups, $R_4$ is n-butyl group, n is an integer of from 4 to 60, and m and p are independently an integer of from 3 to 30 in the general formula (I).

3. The material for contact lenses according to claim 1, wherein said siloxane macromer of component (A) is represented by the following general formula (II):

(II)

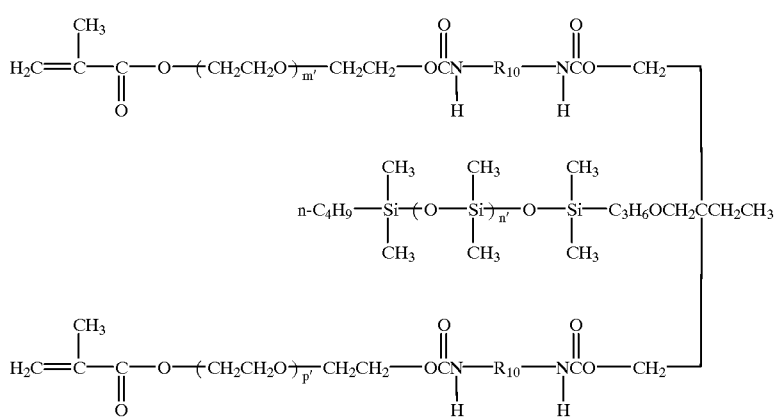

wherein $R_{10}$ is a residue obtained by removing NCO group from an aliphatic, alicyclic or aromatic diisocyanate; n' is an integer of from 4 to 40; and m' and p' are independently an integer of from 3 to 20.

4. The material for contact lenses according to claim 1, wherein the content of the siloxane monomer of component (A) is from 10 to 60% by weight, the content of the water-insoluble monoolefin monomer of component (B) is from 10 to 50% by weight, and the content of the water-soluble monoolefin monomer of component (C) is from 10 to 45% by weight.

5. The material for contact lenses according to claim 1, wherein said water-insoluble monoolefin monomer of component (B) is one or more monomers selected from the group consisting of tris(trimethylsiloxy)-γ-methacryloxypropylsilane, 2,2,2-trifluoroethyl methacrylate, hexafluoroisopropyl methacrylate, and perfluorooctylethyloxypropylene methacrylate.

6. The material for contact lenses according to claim 1, wherein said water-soluble monoolefin monomer of component (C) is one or more monomers selected from 2-hydroxyethyl methacrylate, N,N-dimethylacrylamide, N-vinyl-2-pyrrolidone, and methacrylic acid.

7. A soft contact lens which is obtained by molding the material for contact lenses according to claim 1 in the shape of contact lens, and impregnating the lens with water.

8. A soft contact lens which is obtained by injecting to a mold in the shape of contact lens a monomer mixture comprising a siloxane macromer of component (A) which has the number-average molecular weight of from about 1,000 to 10,000 and is represented by the general formula (I):

(I)

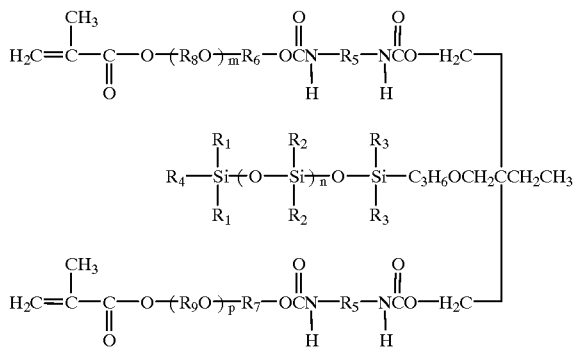

wherein $R_1$, $R_2$ and $R_3$ are independently selected from C1–C4 alkyl groups; $R_4$ is selected from C1–C6 alkyl groups; $R_5$ is a residue obtained by removing NCO group from an aliphatic, alicyclic or aromatic diiocyanate; $R_6$, $R_7$, $R_8$ and $R_9$ are independently selected from C1–C3 alkylene groups; n is an integer of from 4 to 80; and m and p are independently an integer of from 3 to 40, a water-insoluble monoolefin monomer of component (B), and a water-soluble monoolefin monomer of component (C); copolymerizing the monomer mixture; and making the resulting copolymer contain water.

9. The soft contact lens according to claim 8 wherein $R_1$, $R_2$ and $R_3$ are methyl groups, $R_4$ is n-butyl group, n is an integer of from 4 to 60, and m and p are independently an integer of from 3 to 30 in the general formula (I).

10. The soft contact lens according to claim 8, wherein said siloxane macromer of component (A) is represented by the following general formula (II):

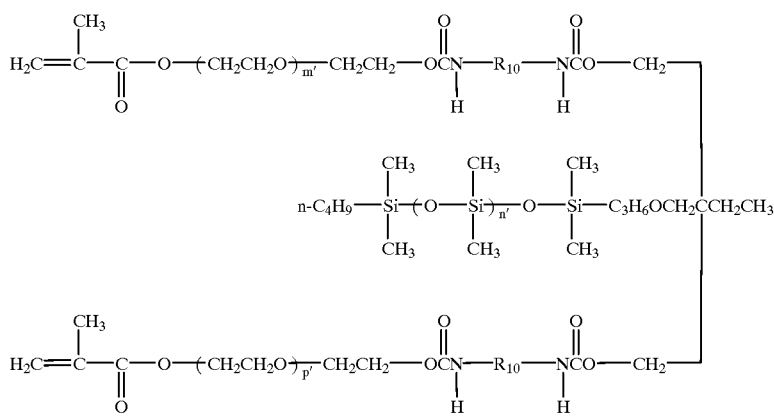

(II)

wherein $R_{10}$ is a residue obtained by removing NCO group from an aliphatic, alicyclic or aromatic diisocyanate; n' is an integer of from 4 to 40; and m' and p' are independently an integer of from 3 to 20.

11. The soft contact lens according to claim 8, wherein the content of the siloxane macromer of component (A) in the monomer mixture is from 10 to 60% by weight, the content of the water-insoluble monoolefin monomer of component (B) is from 10 to 50% by weight, and the content of the water-soluble monoolefin monomer of component (C) is from 10 to 45% by weight.

12. The soft contact lens according to claim 8, wherein said water-insoluble monoolefin monomer of component (B) is one or more monomers selected from the group consisting of tris(trimethylsiloxy)-γ-methacryloxypropylsilane, 2,2,2-trifluoroethyl methacrylate, hexafluoroisopropyl methacrylate, and perfluorooctylethyloxypropylene methacrylate.

13. The soft contact lens according to claim 8, wherein said water-soluble monoolefin monomer of component (C) is one or more monomers selected from 2-hydroxyethyl methacrylate, N,N-dimethylacrylamide, N-vinyl-2-pyrrolidone, and methacrylic acid.

14. The soft contact lens according to claim 7, wherein the water content is from 15 to 35%, and the oxygen permeability constant is not less than $70 \times 10^{-11}$ (cm$^2$/sec)·(mL O$_2$/mL×mmHg).

15. The soft contact lens according to claim 8, wherein the water content is from 15 to 35%, and the oxygen permeability constant is not less than $70 \times 10^{-11}$ (cm$^2$/sec)·(mL O$_2$/mL×mmHg).

* * * * *